United States Patent [19]

Maiden

[11] 4,088,270

[45] May 9, 1978

[54] TWO DIMENSIONAL WEDGE/TRANSLATING SHROUD NOZZLE

[75] Inventor: Donald L. Maiden, Williamsburg, Va.

[73] Assignee: The United States of America as represented by the Administrator of the National Aeronautics and Space Administration, Washington, D.C.

[21] Appl. No.: 672,221

[22] Filed: Mar. 31, 1976

[51] Int. Cl.² .............................................. B64C 15/06
[52] U.S. Cl. .................................. 239/265.25; 60/230; 239/265.33
[58] Field of Search ........................ 239/265.19, 265.25, 239/265.33, 265.27, 265.31, 265.11; 181/33 HD; 60/228, 230, 263, 271

[56] References Cited

U.S. PATENT DOCUMENTS

| | | | |
|---|---|---|---|
| 2,570,629 | 10/1951 | Anxionnaz et al. | 239/265.33 |
| 2,838,909 | 6/1958 | Meulien | 239/265.27 X |
| 2,952,124 | 9/1960 | Pearson | 181/33 HD |
| 3,352,494 | 11/1967 | Colville et al. | 181/33 HD |
| 3,570,247 | 3/1971 | Denning et al. | 239/265.19 X |
| 3,774,868 | 11/1973 | Goetz | 239/265.19 X |

OTHER PUBLICATIONS

D180-19106-1, Cavanagh et al., "Design Feasibility Study of an Airframe Integrated Nozzle Concept," The Boeing Company, Nov. 1975.

R74AEG452, Dusa et al., Turbine Engine Exhaust Nozzle Performance Investigation, Phase I Interim Report, The Boeing Company, May 1974.

Primary Examiner—Evon C. Blunk
Assistant Examiner—Andres Kashnikow
Attorney, Agent, or Firm—Wallace J. Nelson; Howard J. Osborn; John R. Manning

[57] ABSTRACT

A jet propulsion exhaust nozzle particularly useful in multi-engine installations which provides high internal-/external, thrust-minus-drag, performance for transonic cruise or transonic acceleration as well as improved performance at subsonic and supersonic speeds. A two dimensional wedge/translating shroud is provided at the nozzle exit for providing the variable nozzle exit geometry needed to achieve high engine performance over a wide range of throttle power settings.

5 Claims, 8 Drawing Figures

U.S.Patent    May 9, 1978    Sheet 1 of 3    4,088,270

TWO DIMENSIONAL WEDGE/TRANSLATING SHROUD NOZZLE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a jet propulsion exhaust nozzle. More particularly, the invention relates to a two dimensional wedge/translating shroud combination for providing a variable geometry nozzle exit for improved jet engine performance over a wide range of throttle power settings.

A maneuvering fighter airplane that must operate at subsonic and supersonic speeds requires a propulsion exhaust nozzle with a variable geometry to achieve high performance over a wide range of throttle power settings. Because of the high internal performance attainable with variable-geometry axisymmetric nozzles, this type of nozzle has generally been selected for past and present day jet-propelled aircraft designs. Another reason the variable geometry axisymmetric nozzle has been selected has been its low weight for a nozzle-engine item supplied by the engine manufacturers to be installed as a separate item in the airframe supplied by an airframe manufacturer.

The "round" axisymmetric nozzle used in some prior art engines exhibit a small throat/exit area at a typical cruise power setting which is similar to a convergent nozzle and which represents only about 20-25% of the maximum cross sectional area of the nozzle. The design of the external nozzle surface to close the remaining 80-75% of the nozzle area (called closure area) determines the drag level of the nozzle. An external nozzle surface with a steep boattail angle has significantly higher drag, especially as the speed of sound is approached, than a shallow boattail angle nozzle surface. Because of higher weight and higher rate of leak between the nozzle leaves where axisymmetric nozzles are segmented around the circumference, the shallow boattail nozzle is rejected in a trade off of performance for weight saving. It would therefor appear that the solution would be to make the maximum nozzle diameter smaller, hence a smaller engine, which leads to another reason for the large amount of closure area. However, supersonic flight speeds of current fighter aircraft vary up to about a Mach number of 2.5. To achieve these speeds the nozzle must be in the afterburner power setting, i.e., the nozzle geometry must be varied to a convergent-divergent nozzle with a throat area about twice the cruise throat area. A large expansion area ratio ($A_e/A_t \approx 1.6$) is necessary to achieve high performance at M = 2.5 supersonic speeds. Since the throat area in after-burner power setting is twice the cruise throat area and additional area is required for expansion area, the maximum area of the nozzle must be large compared to the throat area at the cruise power setting which unfortunately is generally where the aircraft operates.

At transonic speeds the acceleration of the flow over the steep nozzle boattail and, in multi-engine aircraft, in the channel between the engines/nozzles creates low static pressures on the nozzle-afterbody surfaces which enclose the closure area of the afterbody. In addition, some recent aircraft have twin vertical tails which can also cause adverse pressure gradients on the nozzle-afterbody in addition to the low static pressures on the steep nozzle bottail. Efforts to reduce the steep nozzle boattail, or closure area, by increasing the expansion area while holding the cruise throat area constant causes the peak nozzle performance to shift to a higher nozzle pressure ratio which would be higher than the engine operating pressure ratio. The end result of changing expansion area is lower internal performance in the nozzle off-design case for engine pressure ratios.

The traditional method to maximize thrust-minus-drag at transonic speeds is to minimize the resulting afterbody drag from the low static pressures over the closure area of an airplane model with wind tunnel tests using static tests to determine the internal nozzle performance with variation of expansion area ratio. The closure area of an airplane configuration may have horizontal-tail booms which are used to provide the most effective horizontal tail aft-mounts and/or used for supersonic area ruling. Unfortunately, the horizontal tail booms also have adverse effect at subsonic to transonic speeds. The closure area also includes interfairings which are used to fill the base between the nozzles. These interfairings must be tailored depending on the aircraft configuration and each is independent of the other.

It is therefore an object of the present invention to provide a realistic variable-geometry aircraft engine nozzle for use at high subsonic and supersonic flight speeds. A further object of the present invention is to provide an improved jet engine exhaust nozzle that obviates the problem of integrating the steep boattailed "round" geometry of the cruise nozzles into the aft-end of the aircraft fuselage. An additional object of the present invention is an improved jet engine nozzle serving to reduce the total afterbody drag at transonic speeds for multi-engine aircraft.

BRIEF SUMMARY OF THE INVENTION

The foregoing and other objects which will be more apparent to those of ordinary skill in the art are achieved according to the present invention by providing a two-dimensional wedge/translating shroud nozzle which consists of a circular-to-rectangular transition duct, a collapsing horizontal wedge to provide a variable nozzle throat area, and a shallow boattailed cowl with a retractable translating shroud.

DETAILED DESCRIPTION

A more complete appreciation of the invention and many of the attendant advantages thereof will be more clearly understood by reference to the following detailed description when considered with the accompanying drawings wherein.

Figure 1:
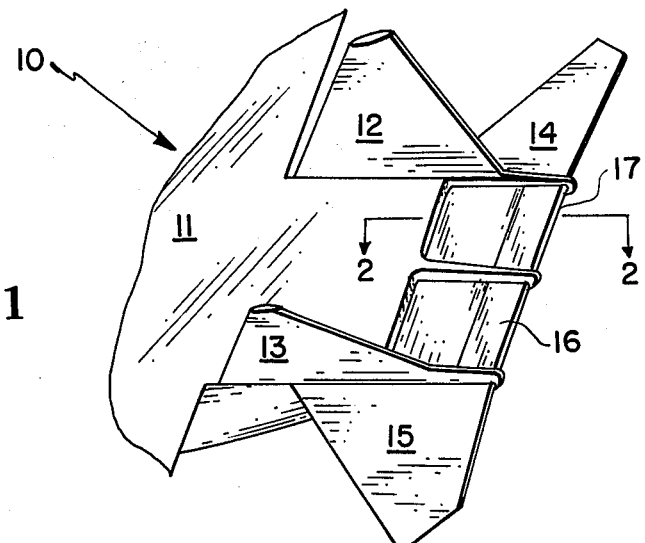
FIG. 1 is perspective view of a twin engine aircraft utilizing the novel jet engine nozzle construction of the present invention with parts of the aircraft omitted for clarity.

Referring now to the drawings and more particularly to FIG. 1 there is shown an aircraft 10 having a wing 11, twin vertical tails 12 and 13 and horizontal tail portions 14 and 15. Aircraft 10 is provided with a pair of novel jet engine nozzles according to the present invention and designated respectively by reference numerals 16 and 17. As shown in FIG. 1, aircraft 10 is provided with an aerodynamically smooth exterior portion completely devoid of the valleys or "gullies" normally found in aircraft having multiengines and employing round nozzles.

Referring now more particularly to FI. 2, the details of one of the nozzles shown in FIG. 1, and as designated generally by reference numeral 17, will be more completely described. Nozzle 17 includes an essentially rectangular exterior cowl or wall 19 having a nozzle liner 20 and a tapered open end throat section 21. The keel line taper of cowl 19 adjacent the open end thereof is at or near 12° with respect to the centerline of the nozzle structure. A two-dimensional wedge 23 is disposed in the open end throat 21 to provide a variable area nozzle throat. Wedge 23 is selectively changeable from a dry power profile as designated by reference numeral 25 to a collapsed afterburner power profile as shown by the dotted lines and designated by reference numeral 27 and as will be further explained hereinafter.

Figure 5:
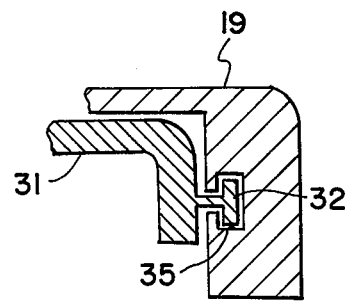
FIG. 5 is a part section view taken along line 5—5 of FIG. 2.
Figure 2:
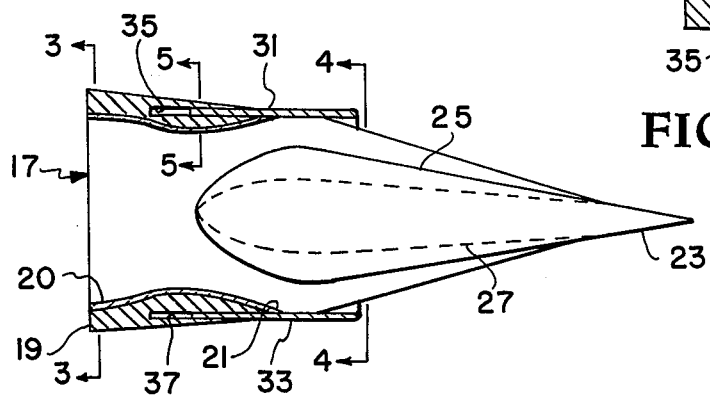
FIG. 2 is a part section of one of the nozzles taken along line 2—2 of FIG. 1.

A pair of translating shrouds 31 and 33 are disposed in exterior wall 19 to selectively vary the nozzle expansion area ratio. Each of shrouds 31 and 33 are designed to move within tracks of channels disposed within wall 19. One track for each shroud 31 and 33 is shown in FIG. 2 and designated respectively by reference numerals 35 and 37. An identical track, not shown, is provided for each shroud on the opposite side thereof. The mating engagement of the shroud and wall 19 is shown more particularly in FIG. 5 with reference to one side of shroud 31. As shown therein, shroud 31 is provided with an integral tab 32 serving to slidably engage track 35. An identical tab construction is provided on the opposite side of shroud 31 to engage an identical track on that side of wall 19. Also, identical tab and track construction (not shown) is provided for both sides of shroud 33.

Figure 3:
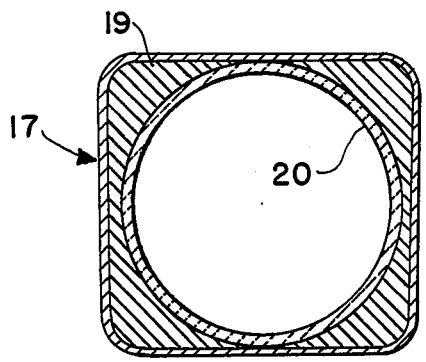
FIG. 3 is a section view of a complete nozzle as taken along line 3—3 of FIG. 2.
Figure 4:
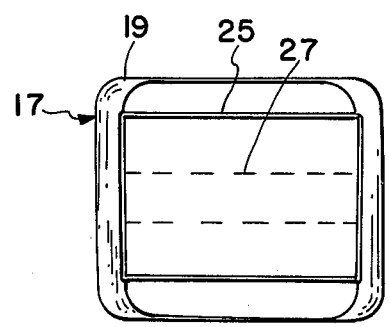
FIG. 4 is a section view of a complete nozzle as taken along line 4—4 of FIG. 2.

Shrouds 31 and 33 are open at each end and have the general shape of a scoop with a flat horizontal main wall and two shorter side walls integrally extending at rounded corners in an essentially 90° relationship with the main wall to give a visual appearance of a reverse air scoop when translated to the fully extended or most aft position. Any suitable and conventional power supply may be utilized for translating and retracting scoops 31 and 33 such for example, hydraulic, electric, or the like, and are not shown herein in the interest of clarity. The circular-to-rectangular transition of the nozzle duct area is more clearly illustrated in FIGS. 3 and 4 showing the cross-sectional area of a complete nozzle 17 at the points designated in the illustration of FIG. 2.

Figure 6:
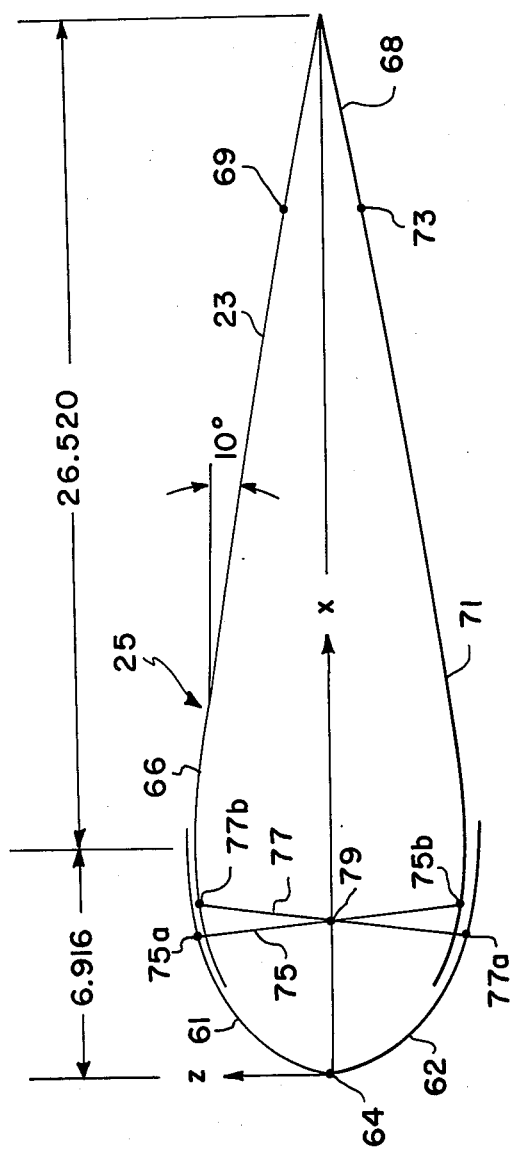
FIGS. 6 and 7 are schematic views of the two-dimensions of the nozzle wedge shown in FIG. 2 and schematically illustrating the mechanism for effecting wedge change for the two dimensions; and, FIG. 8 is a graphic representation of the nozzle area distribution for a scale model nozzle in both the dry-power wedge and afterburner-wedge nozzle.
Figure 7:
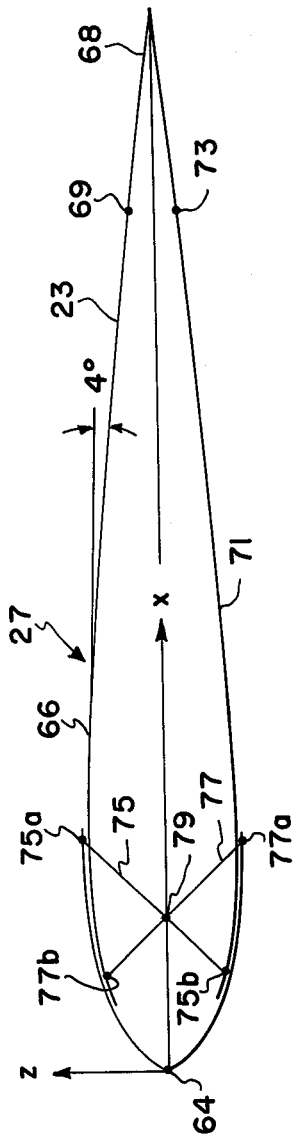

Referring now more particularly to FIGS. 6 and 7, the details of the geometry for the wedge-centerbody 23 will now be described. The wedge design is independent of the internal nozzle area distribution consideration. The blunt parabolic-profile nose of the wedge 23 was selected to provide a shallow local slope as the throat section is approached and to minimize the stagnation-temperature concentration at the leading edge of the wedge in the nozzle throat exit area.

In. FIG. 6 the dry-power wedge profile shown is generally designated by reference numeral 25. The nose portion of wedge 23 consists of two identical sections 61 and 62 which are hinged together at point 64. Section 61 is designed to slightly overlap an arcuate tip of an elongated essentially flat segment 66 at a free end thereof with the other end of segment 66 tapering and hinged to a tip portion 68 of wedge 23 at hinge point 69. Similarly, nose section 62 slightly overlaps an arcuate tip of a second elongated essentially flat segment 71 which, in turn, is hingedly connected to wedge-shaped tip 68 at hinge point 73.

A scissors-type structure serves to collapse the dry-power wedge profile 25 shown in FIG. 6 to the afterburner-power profile 27 shown in FIG. 7. This scissors-type mechanism consists of legs 75 and 77 pivotally connected at the centers thereof at pivot point 79. As shown in the drawings, scissors leg 75 is fixed at one end thereof at point 75a to nose segment 61 and at the other end at point 75b to the arcuate tip of segment 71. Scissors leg 77 is similarly attached at point 77a to nose segment 62 and at point 77b to the arcuate tip of segment 66. Suitable channels (not shown) are provided along the necessary length of the arcuate tips of segments 66 and 71 to permit passage of the respective scissors legs 75 and 77 as the scissors structure is moved from the closed dry-power profile configuration shown in FIG. 6 to the open afterburner power profile configuration shown in FIG. 7. As will be apparent to those skilled in the art, any suitable power mechanism such as hydraulic pistons, electric motors, or the like may be employed to actuate the scissors structure and such mechanism is not shown in detail herein in the interest of clarity, it being understood that the controls for actuating such mechanism would be readily adaptable to extend through the sides of wedge 23 without interference of the variable wedge construction or nozzle flow pattern.

The 10° half-angle (FIG. 6) of wedge 23 in the dry power profile provides a much higher thrust-minus-drag nozzle performance at transonic speeds as compared with, for example, a 15° half-angle wedge. The longer wedge surface may also be used for thrust-reversing or thrust-vectoring flaps if so desired. This would require additional controls and additional segmenting of the wedge portions described as will be readily appreciated by those skilled in the art. The dry-power wedge maximum cross-sectional area represented 42.3% of the maximum nozzle area in a specific scale model which permitted minimum boattail angles. The boattail half angle of wedge 23 in the afterburner profile configuration shown in FIG. 7 was 4°. At transonic speeds the small closure of cowl 19 still produces drag, however by shifting most of the closure area to the wedge the beneficial thrust producing pressure distribution on the wedge tends to minimize this drag effect. The wedge geometry is therefore critical especially near the throat station where a large circular-arc radius connects the converging ramp to the diverging ramp. The wedge profiles dimensions for the dry and afterburner power illustrations of FIGS. 6 and 7, respectively, are shown in the following tables for a ⅛ scale model of the flight hardware.

Table I.

| Dry-wedge coordinates (inches) | |
|---|---|
| x | z |
| 0.0 | 0.0 |
| .693 | 1.321 |
| 1.387 | 2.032 |
| 2.080 | 2.540 |
| 2.774 | 3.048 |
| 3.467 | 3.353 |
| 4.161 | 3.708 |
| 4.854 | 3.962 |
| 5.547 | 4.204 |
| 6.241 | 4.382 |
| 6.934 | 4.470 |
| 7.628 | 4.394 |
| 8.321 | 4.428 |
| 33.836 | 0.0 |

Table II.

| Afterburner-wedge coordinates (inches) | |
|---|---|
| x | z |
| 0.0 | 0.0 |
| .693 | .838 |
| 1.387 | 1.270 |
| 2.080 | 1.575 |
| 2.774 | 1.839 |
| 3.467 | 2.080 |
| 4.161 | 2.230 |
| 4.854 | 2.392 |
| 5.547 | 2.484 |
| 6.241 | 2.532 |
| 6.934 | 2.532 |
| 7.628 | 2.478 |
| 27.122 | 1.115 |
| 33.436 | 0.0 |

Figure 8:
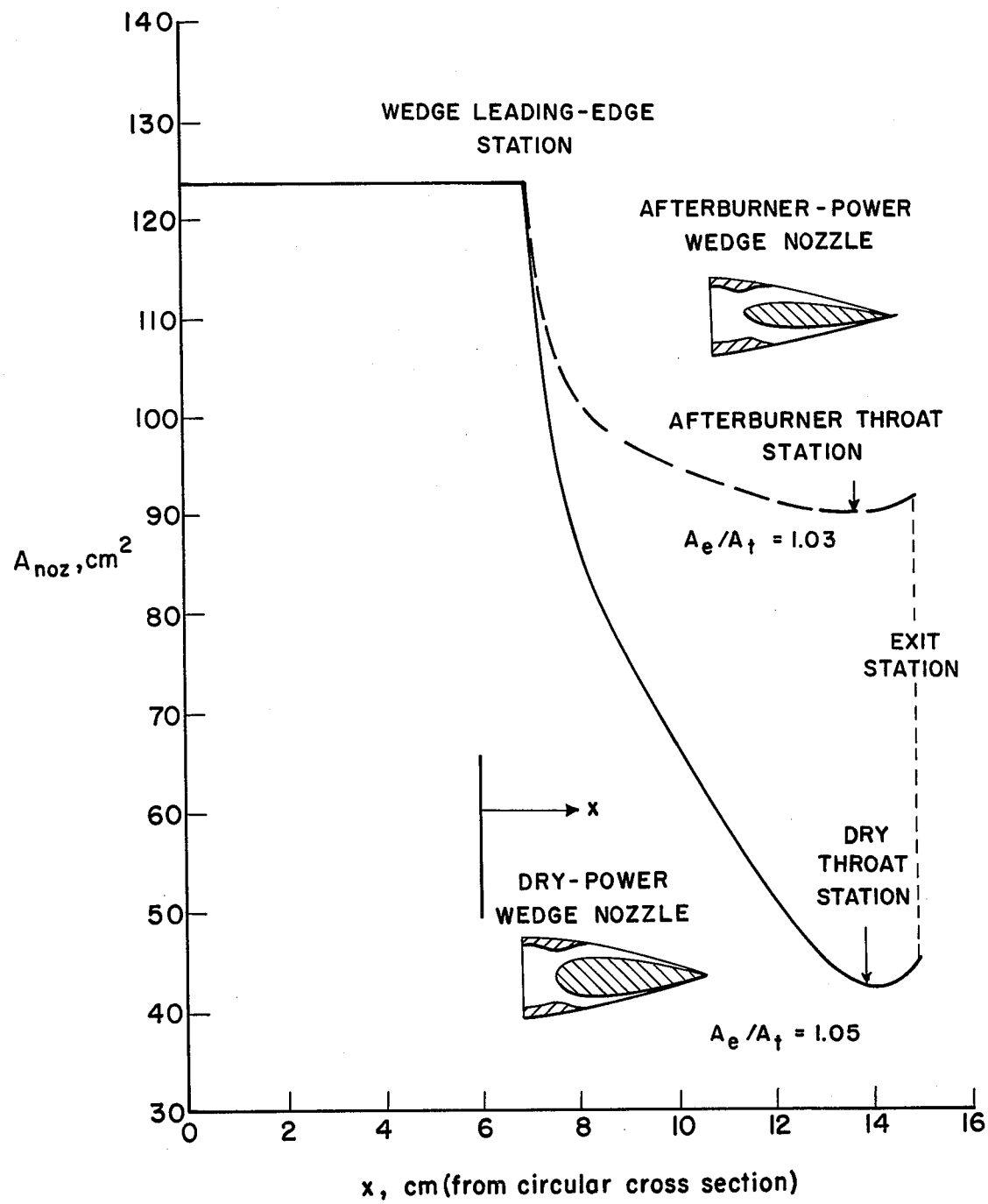

The internal area distribution in nozzle 17 includes the upstream duct transition from a circular cross section as illustrated in FIG. 3 to a circumscribed essentially "square" section with large rounded corners at the wedge leading edge as can be visualized from FIG. 4. The graphic representation of the nozzle area distribution is shown in FIG. 8 for both the dry-power wedge nozzle and for the afterburner-power wedge nozzle. The duct transition from round to "square" continues to the throat section. The nozzle section downstream of the throat has constant geometry and therefore the exit area is dependent only on the wedge half angle, i.e. essentially 10° at dry-power and 4° when at afterburner power.

A constant internal area distribution in the transition upstream of the wedge nose is used to minimize the total-pressure loss in the exhaust flow caused by the drastic change in the duct geometry. This distribution is accomplished by reducing the height of the keel line of the nozzle which results in a two dimensional ramp on the top and bottom of the duct. This two dimensional ramp also serves to divert laterally the exhaust flow entering the converging section of the nozzle and thereby fill in the corners of the two-dimensional throat to minimize corner losses. Since the sidewalls remain virtually flat, the wedge centerbody installation and operation is simplified. The area distribution of the nozzle from the wedge-nose station to the throat station is designed as an approximated parabolic distribution allowing the necessary area convergence to choke the nozzle at the throat (FIG. 8). The rationale for the parabolic area distribution is to minimize the local slopes upstream of the throat in order to reduce the risk of flow separation as the flow is turned down the 10° wedge surface, and to achieve a uniform sonic line at the throat of the nozzle.

The only critical exterior contour for the exterior wall or cowl 19 is the outside keel line. The outside beam line can be a circular-arc boattail with a boattail angle essentially but not exceeding 6°. Boattail angle as used herein as the angle between the tangent line to the circular-arc and the nozzle center line.

Nozzle 17 represents a two-dimensional wedge nozzle with an exit area 1.05 times the throat area. In order to be efficient at supersonic speeds the ratio of exit-to-throat area must be variable. To achieve this variation, translating spade-shaped shrouds 31 and 33 are added to the nozzle as shown in FIG. 2. These shrouds will travel in the tracks 35 and 37, and two others not shown, on each side of nozzle 17 on the top and bottom of the wedge 23. In both dry and afterburner wedge operation, at static take-off the shrouds are retracted yielding an expansion area ratio of 1.05. At subsonic speeds $0.6 \leq M \leq 0.95$, shroud 31 and 33 are translated to achieve an exit-to-throat area ratio of 1.15. At supersonic speeds the shrouds are fully translated to achieve maximum $A_e/A_t$ which for dry power is about 1.53 and 1.12 for afterburner power. Thus, shrouds 31 and 33 contribute to nozzle efficiency only at speeds of essentially 0.6M and above. Although shrouds 31 and 33 are described as operating in unison, it is readily apparent that sequential operation thereof may be effected for thrust vector control when so desired. Test results of the performance of the novel nozzle disclosed are available in NASA TN D-7906 dated April 1975 and are not included herein in the interest of brevity. Also the calculations for achieving the dimensions for the specific embodiment disclosed herein are available.

Although the specific details are not included in the present description it is to be understood that the two-dimensional wedge 23 described herein may be internally pressurized by external air taken in through suitable ramair scoops, or by bleeding off part of the compressed air from the jet engine compressor to the interior of the wedge or by a separate pressure source. Also, where cooling of the wedge or other nozzle parts is needed, any conventional cooling system such as utilizing flow of the propellant or compressed air in an heat exchange relationship or the like, may be employed. Additionally, where thrust vectoring and thrust reversing flaps are deemed advisable, these features can be readily adapted to the present nozzle wedge by providing additional hinged segment portions.

No specific materials have been described herein relative to the construction of the various parts and numerous conventional materials for nozzle construction adapted to withstand the high temperatures that are employed in present day jet exhaust nozzles will be readily apparent to those skilled in the art.

Thus, although the present invention has been described relative to a specific embodiment thereof, it is not so limited and many modifications and variations thereof will be readily apparent to those skilled in the art in the light of the above teachings. For example, the tabs 32 employed in track 35 and the others, not shown, could take the form of one long tab extending the length of the individual shrouds, multiple tabs spaced along the length of the shrouds, a set of wheels or rollers spaced along the shroud, or a rack and pinion arrangement. Also, the track 35 and others, not shown, could be formed in the shrouds and the cooperating tabs or wheels extended from the cowl wall. Also, although the nozzle has been described relative to horizontally disposed multi-engines, it also may be used for single engine applications as well as for vertically stacked engines. It is therefore to be understood that the invention may be practiced otherwise than as specifically described herein.

What is claimed as new and desired to be secured by Letters Patent of the United States is:

1. An improved nozzle for use with jet propelled aircraft comprising:
   an essentially rectangular exterior nozzle housing having a top wall, a bottom wall and two side walls,
   said top and bottom walls of said housing terminating in a mutually transverse plane and said two side walls tapering to a point extending beyond the top and bottom walls to thereby form an exit for said nozzle;
   a nozzle throat area adjacent the nozzle exit;
   a two-dimensional wedge centerbody having a symmetrical aerodynamic exterior configuration and disposed in said nozzle exit and secured to said side walls of said housing,
   said nozzle housing having an internal section configuration that provides a gradual change from a circular duct area to an essentially rectangular section at the nozzle throat and exit plane,
   said two-dimensional wedge centerbody being disposed in said rectangular section and serving to form with said top and bottom walls a pair of spaced rectangular openings serving as the nozzle exit,
   said wedge centerbody being formed of a nose segment, a body segment and a tail segment and said nose segment being formed of two identical arcuate members hingedly connected along a hinge line to permit relative movement of the arcuate members toward each other along said hinge line, said body segment comprising two identical essentially flat members, each of said essentially flat members being hingedly connected at one end to opposite sides of an open end tail segment, said tail segment being of a wedge configuration and having an open end and a closed tip end, said other end of said essentially flat members each being provided with arcuate tips and telescopically received, individually, within one of said arcuate members forming said wedge nose segment, and
   means for varying the thickness of said two-dimensional wedge centerbody between a contracted dimension and an expanded dimension to thereby vary the nozzle exit-to-throat area, while maintaining a symmetrical aerodynamic configuration for said wedge.

2. The nozzle of claim 1 including multiple means for providing a variable nozzle exit geometry to said nozzle and said multiple means including structure for changing the dimensions of said wedge from a first dry-power dimension to a second afterburner power dimension and thereby achieve improved jet engine performance in an aircraft over a wide range of throttle power settings.

3. The nozzle of claim 2 wherein said multiple means for providing a variable nozzle exit geometry includes a pair of translating shroud members, said shroud members being slidably disposed one each in said top and bottom walls and selectively extendable from a position where the shrouds are completely stowed within said walls to a position wherein the shrouds form extensions of said top and bottom walls to serve with said wedge to vary the nozzle exit-to-throat ratio from about 1.05 to about 1.53, and said shrouds being provided with tab extensions on each side along the length thereof and said top and bottom walls being provided with tracks serving to permit sliding movement of said tab extensions therein.

4. The nozzle of claim 1 including scissors structured means having a pair of legs pivotally connected intermediate the leg ends and securing the telescoped arcuate tip portion of the first of said essentially flat members forming said nose segment and the second of said essentially flat members to the other of said arcuate members, whereby when said scissors means have the legs thereof in an essentially closed position said arcuate members will be expanded and said flat members disposed adjacent the expanded ends to form a wedge having a boattail angle in the order of 10° and when said scissors means have the legs thereof in an essentially closed position, said arcuate members and said flat members will be telescopically collapsed to thereby form a wedge having a bottail angle in the order of 4°.

5. The nozzle of claim 4 wherein said wedge having a bottail angle in the order of 10° is employed in the nozzle dry power mode and said wedge is collapsed to provide an angle of essentially 4° when the nozzle is employed in the afterburner power mode.

* * * * *